United States Patent
Hua et al.

(10) Patent No.: US 9,207,378 B2
(45) Date of Patent: Dec. 8, 2015

(54) BACKLIGHT MODULE, DISPLAY DEVICE AND METHOD FOR ELIMINATING HOTSPOT EFFECT

(71) Applicants: BOE Technology Group Co., Ltd., Beijing (CN); Beijing BOE Display Technology Co., Ltd., Beijing (CN)

(72) Inventors: Guangsheng Hua, Beijing (CN); Zhanchang Bu, Beijing (CN); Yi Deng, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 53 days.

(21) Appl. No.: 13/995,948

(22) PCT Filed: Nov. 23, 2012

(86) PCT No.: PCT/CN2012/085190
§ 371 (c)(1),
(2) Date: Jun. 19, 2013

(87) PCT Pub. No.: WO2014/019302
PCT Pub. Date: Feb. 6, 2014

(65) Prior Publication Data
US 2014/0085930 A1    Mar. 27, 2014

(30) Foreign Application Priority Data
Jul. 31, 2012    (CN) .......................... 2012 1 0271384

(51) Int. Cl.
*G02B 6/00*    (2006.01)
*F21V 8/00*    (2006.01)
*F21K 99/00*    (2010.01)

(52) U.S. Cl.
CPC ................ *G02B 6/0011* (2013.01); *F21K 9/52* (2013.01); *G02B 6/002* (2013.01); *G02B 6/0068* (2013.01)

(58) Field of Classification Search
CPC ........................ G02F 1/133615; G02B 6/0023
USPC .......................... 362/612, 617, 618, 606–608
See application file for complete search history.

(56) References Cited

U.S. PATENT DOCUMENTS

| 7,810,978 B2 * | 10/2010 | Ohno | 362/612 |
| 2005/0013127 A1 | 1/2005 | Tsai | |

(Continued)

FOREIGN PATENT DOCUMENTS

| CN | 101405626 A | 4/2009 |
| CN | 101900277 A | 12/2010 |

(Continued)

OTHER PUBLICATIONS

First Office Action (Chinese language) for CN application 201210271384.1 issued by the State Intellectual Property Office, Oct. 8, 2013, 5 pages.

(Continued)

*Primary Examiner* — Julie Bannan
(74) *Attorney, Agent, or Firm* — Ladas & Parry LLP

(57) ABSTRACT

Disclosed are a backlight module and a display device and method using the same, the backlight module comprises light-guide plate (302), an optical film (303) attaching to a side of a light emitting face of the light-guide plate (302), and a strip-like assembly (301) of point light source disposed at the side of the light incident face of the light-guide plate (302), the strip-like assembly (301) of point light source comprises point light sources toward the light incident face of the light-guide plate (302) thereon, an edge of one side of the optical film (303) corresponding to the light incident face of the light-guide plate (302) is provided with indents (303*a*).

1 Claim, 3 Drawing Sheets

(56) References Cited

U.S. PATENT DOCUMENTS

2009/0251921 A1* 10/2009 Toussaint et al. ............. 362/607
2010/0225850 A1 9/2010 Hashimoto
2011/0116285 A1* 5/2011 Cheng et al. ................. 362/612

FOREIGN PATENT DOCUMENTS

| CN | 102565921 A | 7/2012 |
|---|---|---|
| CN | 202419364 U | 9/2012 |
| KR | 20110066480A B | 11/2007 |
| KR | 20070108991A B | 6/2011 |

OTHER PUBLICATIONS

English translation of the First Office Action, listed above, 3 pages.
PCT International Search Report (Chinese language) issued by the International Searching Authority, Jul. 31, 2012, 12 pages.
English translation of CN101405626(A), listed above, 51 pages.
English translation of CN102565921(A), listed above, 11 pages.
English translation of CN202419364(U), listed above, 7 pages.
English translation of CN101900277(A), listed above, 20 pages.
Korean Intellectual Property Office (KIPO) (Korean language) first office action issued on May 27, 2014 by KIPO in Korean Patent Application KR10-2013-7014207. Five (5) pages.
English Translation of the Korean Intellectual Property Office (KIPO) first office action issued on May 27, 2014 by KIPO in Korean Patent Application KR10-2013-7014207. Three (3) pages.
English abstract of KR20070108991A; Two (2) pages.
English abstract of KR20110066480A; Two (2) pages.
Office Action (Korean language) issued by the Korean Intellectual Property Office ("KIPO") for Application No. 10-2013-7014207, issued on Sep. 5, 2014, 3 pages.
English translation of Office Action issued by KIPO for Application No. 10-2013-7014207, listed above, 2 pages.
International Preliminary Report on Patentability for International Application No. PCT/CN2012/085190 dated Feb. 3, 2015, seven (7) pages.

* cited by examiner

BACKLIGHT MODULE, DISPLAY DEVICE AND METHOD FOR ELIMINATING HOTSPOT EFFECT

CROSS REFERENCE TO RELATED APPLICATIONS

This application is based on International Application No. PCT/CN2012/085190 filed on Nov. 23, 2012, which claims priority to Chinese National Application No. 201210271384.1, filed on Jul. 31, 2012, the contents of which are incorporated herein by reference.

TECHNICAL FIELD

Embodiments of the present invention relate to a backlight module, a display device and a method for eliminating hotspot effect.

BACKGROUND

A conventional side-illuminating liquid crystal display device comprises a backlight module of the configuration as shown in FIG. 1. The backlight module comprises a light-guide plate 102, an optical film 103 provided on a side of the light emitting face 102b of the light-guide plate 102, and LED bar 101 provided on a side of the light incident face 102a of the light-guide plate 102. The LED bar 101 comprises several LEDs 101a disposed at the side thereof facing the light-guide plate 102, the light emitted from the LEDs 101a enters the light-guide plate 102 through the light incident face 102 of the light-guide plate 102 and then is guided to the optical film 103. Because the LEDs 101 usually are distributed separately along the length direction of the LED bar 101, hotspots causing uneven shade readily appears at the edge of the light-guide plate 102 adjacent to the light incident face 102a. When such a backlight module is used in the display device, the hotspots will spread from the non-displaying area to the displaying area of the display device, and then influence the display effect in the displaying area. When hotspot phenomenon occurs, it's generally required to regulate the grid point design of the light-guide plate, return the light-guide plate to its supplier for regulation, and the regulation period is relatively long, and the regulated effect is not good.

SUMMARY

Embodiments of the present invention provide a backlight module, a display device and a method for eliminating the hotspot effect, to quickly and effectively eliminate the hotspot effect.

A first aspect of the present invention provides a side-illuminating backlight module, comprising light-guide plate, an optical film attaching to a side of a light emitting face of the light-guide plate, and a strip-like assembly of point light source disposed at the side of the light incident face of the light-guide plate; the strip-like assembly of point light source comprises point light sources toward the light incident face of the light-guide plate thereon, an edge of one side of the optical film corresponding to the light incident face of the light-guide plate is provided with indents.

In the backlight module, for example, the point light sources may be LEDs, the strip-like assembly of point light source may be an LED bar.

In the backlight module, for example, the indents may correspond to the point light sources in position.

In the backlight module, for example, the shape of the indents may be part of an oval.

A second aspect of the present invention further provides a display device comprising the above mentioned backlight module.

In the display device, for example, the indents of the optical film may be located outside of a displaying area of the display device.

A third aspect of the present invention provides a method for eliminating hotspots of a backlight module, the backlight module comprising a light-guide plate, an optical film attaching to a side of a light emitting face of the light-guide plate, and a strip-like assembly of point light source positioned at the side of the light incident face of the light-guide plate, the strip-like assembly of point light source comprises point light sources toward the light incident face of the light-guide plate thereon, and the method comprises the following steps:

S1: performing optical simulation of the backlight module to simulate hotspot effect;

S3: based on simulation results, cutting an edge of the optical film corresponding to the light incident face of the light-guide plate so as to form indents.

The method, for example, may further comprise, between step S1 and S3, step S2 of optimizing the shape of the indents to be formed for the optical film of the backlight module.

In this method, for example, the step S2 may comprise:

S21: based on the simulated extent of hotspot effect, performing simulation cutting for the optical film of the backlight module to achieve simulation indents, then performing optical simulation of the backlight module to simulate hotspot effect; and S22: if stimulation extent of hotspot effect does not yet reach predetermined expectation, then regulating a shape and size of the simulation indents of the optical film and returning to step S21; and if obtained extent of hotspot effect reaches the predetermined expectation, then using the obtained simulation indents for the indents to be formed for the optical film and returning to step S3.

The backlight module provided in an embodiment of the present invention makes the incident light distributed evenly by providing indents for the optical film of the backlight module so as to effectively and quickly eliminate the hotspot effect of the backlight module.

The display device provided in an embodiment of the present invention, by using the above described backlight module, and makes it not easy for hotspot effect to occur or the extent of hotspot effect relatively gentle in the display device. The method for eliminating hotspot effect provided in an embodiment of the present invention eliminates or reduces the hotspot effect by simulating the backlight module to obtain the extent of hotspot effect and then by cutting the optical film to form indents.

BRIEF DESCRIPTION OF THE DRAWINGS

In order to illustrate the technical solution of the embodiments of the present invention more clearly, a simply introduction about the drawings of the embodiments will be made in the following, and obviously, the drawings described below relate to only some embodiments of the present invention but are not of limitation to the present invention.

REFERENCE NUMERALS

101: LED bar; 101a: LED; 102: light-guide plate; 102a: light incident face; 102b: light emitting face; 103: optical film; 201: LED bar; 201a: LED; 202: light-guide plate; 202a: light incident face; 202b: light emitting face; 203: optical film; 203a: indent; 301: LED bar; 302: light-guide plate; 303: optical film; 303a: indent.

DETAILED DESCRIPTION

To make clearer the object, technical solutions and advantages of the embodiments of the present invention, a clear and full description of the technical solution of the embodiment of the present invention will be made with reference to the accompanying drawings of the embodiment of the present invention. Obviously, the described embodiments are merely part of the embodiments of the present invention, but not all the embodiments. Based on the described embodiments of the present invention, all the other embodiments acquired by the ordinary skilled in this art, without any creative labor, fall into the protective scope of the present invention.

Unless defined otherwise, the technical or scientific terminology being used should take the meaning usually understood by the ordinary skilled in this art of the present invention. The phrase such as "first", "second" or the like used in the patent application specification and claims of the present invention does not mean any sequence, quantity or importance, but are only used to distinguish different components. Similarly, the phrase such as "a", "an" or "the" does not mean quantitative restriction, but mean the existence of at least one object. The phrase such as "comprise," "include," "contain" or the like intends to mean that the element or article before the phrase encompass the elements or articles and the equallent thereof listed after the phrase, and does not exclude other element(s) or article(s). "Connecting," "connected" or the like is not limited to physical or mechanical connection, but may comprise electrical connection regardless of being direct or indirect. Furthermore, the phrase such as "upper", "lower", "left", "right", or the like is used only for describing a relative positional relationship, which will be varied correspondingly when the described objects are changed in its absolute position.

Embodiment 1

Figure 1:
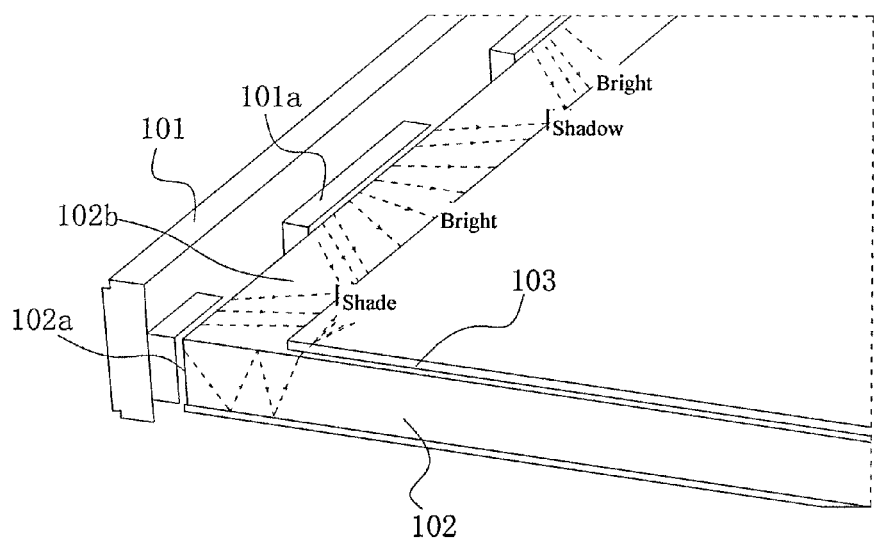
FIG. 1 is a structural schematic view of a backlight module of conventional side-illuminating liquid crystal display.
Figure 2:
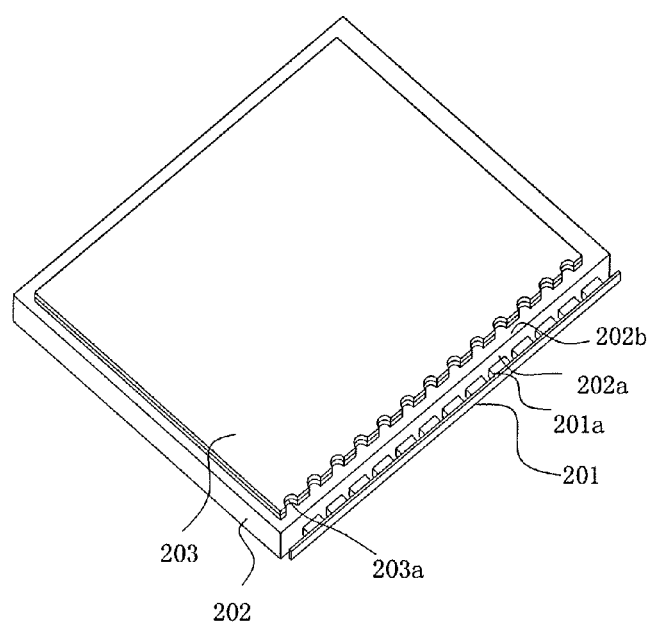
FIG. 2 is a structural schematic view of a backlight module according to a first embodiment of the present invention.

As shown in FIG. 2, the present embodiment discloses a backlight module, which is a side-illuminating backlight module, comprising a light-guide plate 202, an optical film 203 attached to a side of the light emitting face 202b of the light-guide plate 202, and an LED bar 201 located at a side of the light incident face 202a of the light-guide plate 202. The LED bar 201 comprises several LEDs 201a facing the light incident face 202a of the light-guide plate 202 provided on the LED bar 201; and the edge of the side of the optical film 203 corresponding to the light incident face 202a of the light-guide plate 202 is provided with several indents 203a.

An LED 201a is an example of the point light source; and the LED bar 201 is an example of a strip-like assembly of point light sources.

An example of the optical film 203 comprises a light diffusion film, a brightness enhancement film or the like. The light-guide plate is made of, for example, a resin material, and may be a plate in a flat form or a wedge form. In the embodiments, there may be further provided with reflector plate or may be formed with a reflector configuration at a side of the light-guide plate, which side is opposite to the light emitting face 202b.

For example, the indents 203a may correspond to the LEDs 201a in their positions, such as, in one-to-one correspondence. The lateral dimension of each indent 203a (i.e., the dimension along the light incident face of the light-guide plate) is, for example, equivalent to or less than the size of one LED, and the longitudinal dimension thereof (i.e., the height perpendicular to the light incident face of the light-guide plate) is, for example, ⅕~½ of the lateral dimension, as shown in FIG. 2.

Embodiment 2

Figure 3:
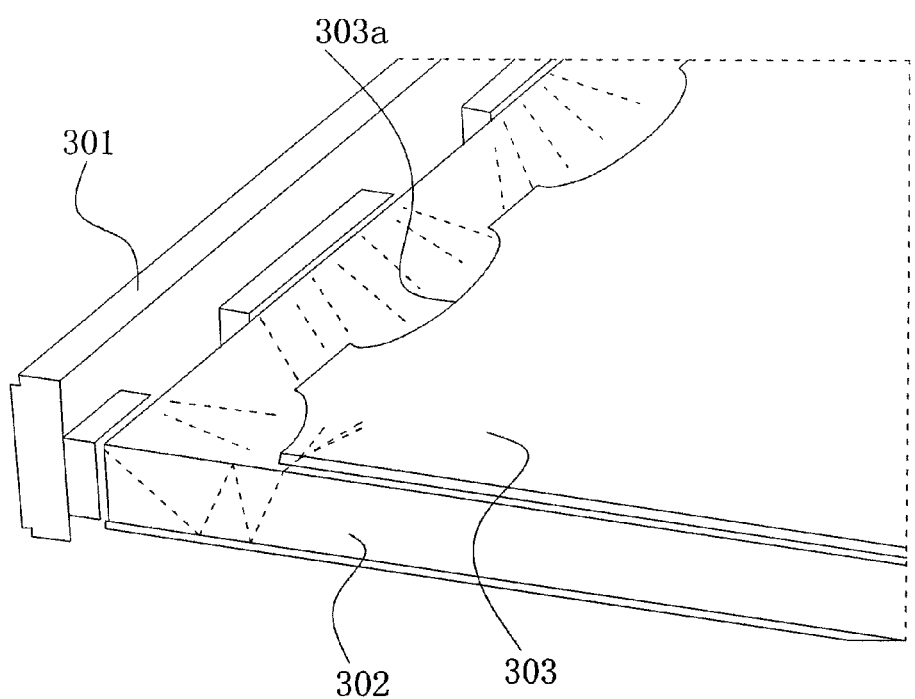
FIG. 3 is a structural schematic view of a backlight module according to a second embodiment of the present invention.

The LED bar 301 and the light-guide plate 302 of the backlight module of the present embodiment have the same configuration as those in embodiment 1, and in the present embodiment, as shown in FIG. 3, the shape of the indents 303 of the optical film 303 is part of an oval. Naturally, in other embodiments of the present invention, the indents may also have another regular (such as, whole or part of a circle, a parabolic etc) or irregular shape according to the requirement for reducing hotspot effect. Absolutely, the indents are preferable in a regular shape to facilitate machining; in one example, the shape of the indents is smoothly curved face.

Embodiment 3

This embodiment discloses a display device comprising the backlight module according to embodiment 1 or 2. This display device is, for example, a liquid crystal display device.

For example, the indents of the optical film are located outside of the displaying area of the display device, and for example shielded by the outer frame of the display device, and thereby do not affect display. The indents can reduce hotspots appearing in the displaying area but will not affect display in the displaying area.

Embodiment 4

This embodiment discloses a method for eliminating hotspot effect of a backlight module. The backlight module is, for example, the backlight module according to embodiment 1 or 2. The method comprises the following steps: S1: performing optical simulation of the backlight module to simulate hotspot effect; S3: based on simulation results, cutting an edge of the optical film corresponding to the light incident face of the light-guide plate so as to form indents.

Embodiment 5

This embodiment discloses a method for eliminating hotspot effect. The method of this embodiment is a modification of embodiment 4, comprising the following steps:

S1: performing optical simulation of the backlight module to simulate hotspot effect;

S2: optimizing the shape of the indents to be formed for the optical film of the backlight module;

S3: based on simulation results, cutting an edge of the optical film corresponding to a light incident face of a light-guide plate so as to form indents.

In this embodiment, one example of the step S2 comprises:

S21: based on the resultant extent of the hotspot effect from simulation, performing simulation cutting of the optical film of the backlight module to obtain simulation indents, and then performing optical simulation of the backlight module to simulate hotspot effect;

S22: if the resultant extent of the simulated hotspot effect from stimulation yet does not reach predetermined expectation, then regulating the shape and size of the simulation indents of the optical film and returning to step S21; and if the resultant extent of the obtained hotspot effect reaches the predetermined expectation, then using the obtained simulation indents for the indents to be formed on the optical film and returning to step S3.

Figure 4:
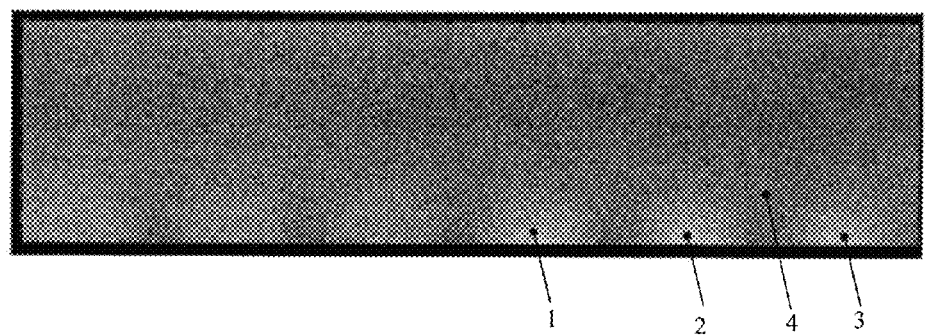
FIG. 4 is a resultant schematic view of the optical simulation of the optical film after simulation cutting of optical film according to a fifth embodiment of the present invention.
Figure 5:
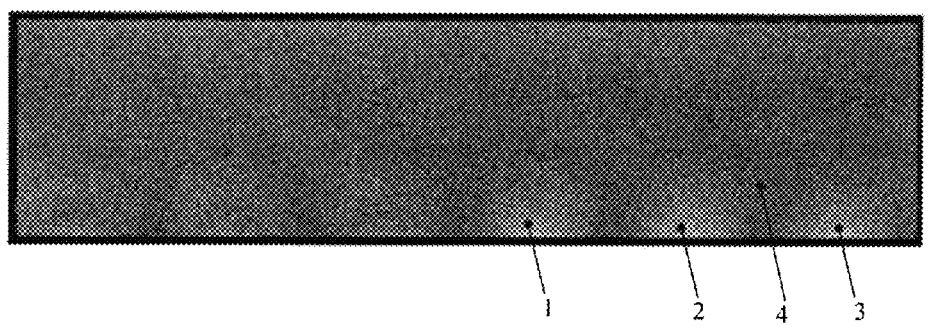
FIG. 5 is a resultant schematic view of the optical simulation of the optical film after another simulation cutting of the optical film according to a fourth embodiment of the present invention.

FIGS. 4 and 5 illustrate the resultant presentation achieved from two times of optical simulations for the backlight module. In the first backlight module corresponding to FIG. 4, the indents of the optical film of the backlight module are of a semi ellipse shape having a semi-major axis of 20 mm and a semi-minor axis of 8 mm; in the second backlight module corresponding to FIG. 5, the indents of the optical film of the backlight module is of a semi ellipse shape having a semi-major axis of 20 mm and a semi-minor axis of 10 mm. Table 1 shows the simulation values of brightness of three test points (points 1, 2 and 3) where hotspot effect occurs as well as the test point (point 4) where hotspot effect does not occur in the above two backlight modules before and after cutting.

TABLE 1

Simulation values of brightness of four test points (points 1, 2, 3 and 4) before and after cutting

| | Test point | Point 1 | Point 2 | Point 3 | Point 4 |
|---|---|---|---|---|---|
| First backlight module | Pre-cutting brightness (nit) | 6158 | 6446 | 6245 | 3800 |
| | Post-cutting brightness (nit) | 4762 | 4572 | 4644 | 3800 |
| Second backlight module | Pre-cutting brightness (nit) | 6811 | 6760 | 6848 | 3800 |
| | Post-cutting brightness (nit) | 3952 | 4065 | 4055 | 3800 |

As can be seen from Table 1, before cutting, the brightness of the test points (points 1, 2 and 3) where hotspot effect occurs in the backlight module is relatively higher, while after cutting, the brightness of these test points where hotspot effect occurs is decreased significantly, notably approaching the brightness of the test point (point 4) where hotspot effect does not occur, thereby effectively eliminating the hotspot effect.

From FIGS. 4 and 5 as well as Table 1, the change of the shapes of the indents also influences the hotspot effect greatly. According to the method of this embodiment, when the optical film of the backlight module are cut to have indents of an appropriate shape, the extent of the hotspot effect may be even more effectively eliminated.

Absolutely, because the extent to which the hotspot effect occurs can be eliminated by forming indents of the optical film only, step S2 can be omitted in another embodiment of the present invention, such as embodiment 4, that is, the shape of the indents is not optimized. For example, favorable indents may be selected artificially as a matter of experience to perform cutting of the optical film.

From the above embodiments of the present invention, it can be seen that the embodiments of the present invention can more quickly and effectively eliminate hotspot effect of a backlight module, achieving better display effect of a display device.

The above are only the exemplary embodiments of the present invention, but not limiting the protective scope of the present invention, the protective scope of the present invention is determined by the appended claims.

The invention claimed is:

1. A method for eliminating hotspots of a backlight module, the backlight module comprising a light-guide plate, an optical film attaching to a side of a light emitting face of the light-guide plate, and a strip-like assembly of point light source positioned at the side of the light incident face of the light-guide plate, the strip-like assembly of point light source comprising point light sources toward the light incident face of the light-guide plate thereon, comprising the following steps:

S1: performing optical simulation of the backlight module to simulate hotspot effect;

S2: optimizing a shape of the indents to be formed for an optical film of the backlight module;

S3: based on simulation results, cutting an edge of the optical film corresponding to the light incident face of the light-guide plate so as to form indents;

wherein the step S2 comprises:

S21: based on the simulated extent of hotspot effect, performing simulation cutting for the optical film of the backlight module to achieve simulation indents, then performing optical simulation of the backlight module to simulate hotspot effect; and S22: if stimulation extent of hotspot effect does not yet reach predetermined expectation, then regulating a shape and size of the simulation indents of the optical film and returning to step S21; and if obtained extent of hotspot effect reaches the predetermined expectation, then using the obtained simulation indents for the indents to be formed for the optical film and returning to step S3.

* * * * *